United States Patent [19]

Telang et al.

[11] 3,860,367

[45] Jan. 14, 1975

[54] CONTROLLED POROUS COATING FOR ROTARY ENGINE SIDE HOUSING

[75] Inventors: Yeshwant P. Telang, Grosse Ile; James C. Uy, Dearborn Heights, both of Mich.

[73] Assignee: Ford Motor Company, Dearborn, Mich.

[22] Filed: Aug. 24, 1973

[21] Appl. No.: 391,376

[52] U.S. Cl. ............................................... 418/178
[51] Int. Cl. .............................................. F01c 21/10
[58] Field of Search .................... 418/152, 178, 179; 417/DIG. 1

[56] References Cited
UNITED STATES PATENTS

| | | | |
|---|---|---|---|
| 2,345,975 | 4/1944 | Herman | 418/179 X |
| 2,905,376 | 9/1959 | Davey | 418/179 X |
| 3,033,180 | 5/1962 | Bentele | 418/179 X |
| 3,289,649 | 12/1966 | Lamm | 418/179 X |
| 3,456,624 | 7/1969 | Okamoto | 418/178 X |
| 3,460,481 | 8/1969 | White, Jr. | 418/179 |
| 3,778,201 | 12/1973 | Caffrey | 418/178 X |

Primary Examiner—C. J. Husar
Assistant Examiner—Leonard Smith
Attorney, Agent, or Firm—Keith L. Zerschling; Joseph W. Malleck

[57] ABSTRACT

A side wall coating system is disclosed for use in a rotary internal combustion engine having a narrow chamber bounded by a pair of flat side walls and an epitrochoidally-shaped end wall joining the side walls. A rotor is mounted for planetary movement in the chamber and in close spacing with each of said side walls, the rotor carries annular seals sliding against said side walls to define a shifting oil chamber in the spacing between the rotor and each of said side walls. The coating system comprises a self-fused particle coating across the entire area of each of said side walls and is comprised of an admixture of stainless steel and nickel-based alloy powders of generally equal hardness. A resin is impregnated in said coating effective to close the pores substantially below the surface of said coating but the pores adjacent the surface are devoid of such resin as a result of decomposition under engine operating conditions. The decomposition of the resin insures limited porosity for retention of a controlled amount of oil to facilitate an oil film between the scraping seals and the side housing wall and also assure a deposit of carbon acting as a dry lubricant to further facilitate the metallic contact therebetween.

6 Claims, 5 Drawing Figures

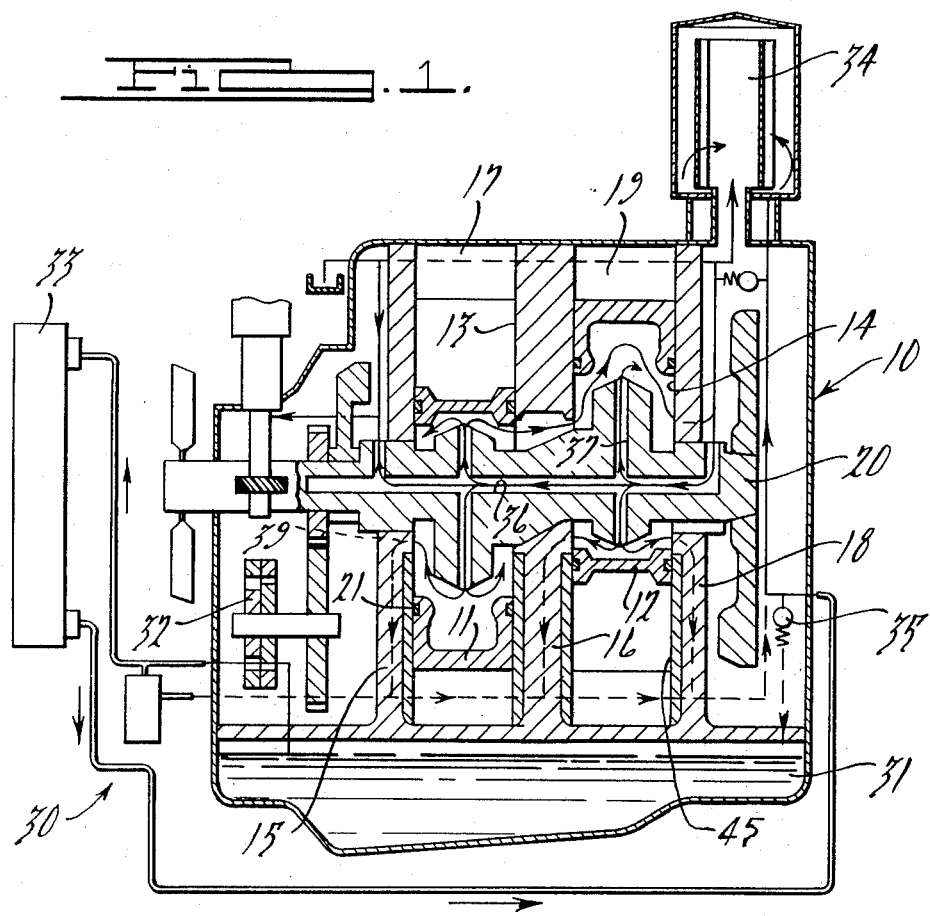
FIG. 1.
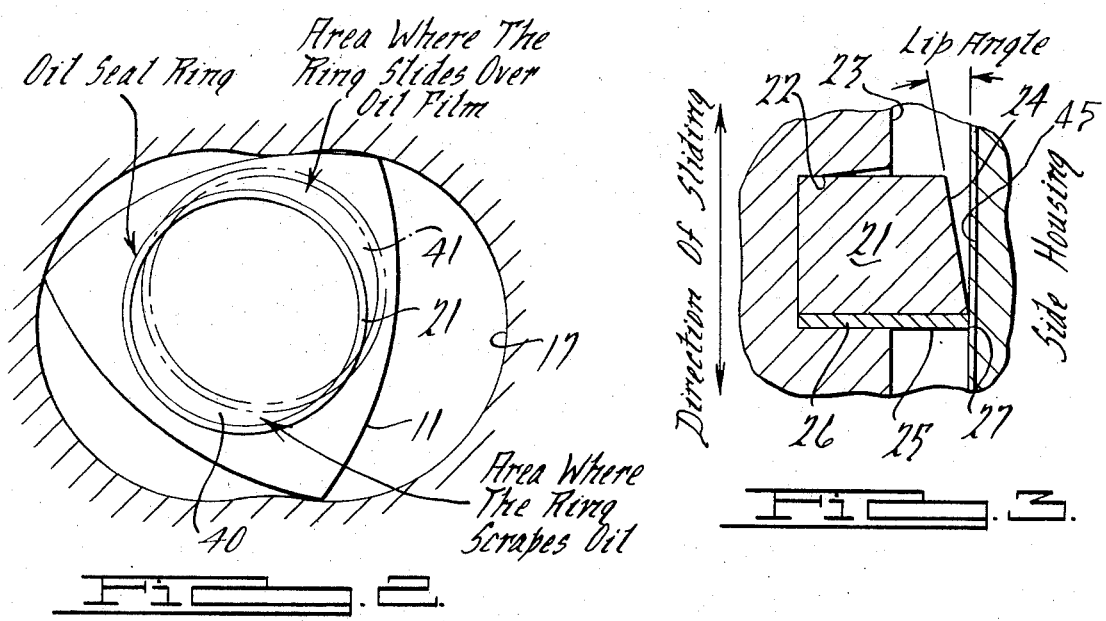
FIG. 2.
FIG. 3.

CONTROLLED POROUS COATING FOR ROTARY ENGINE SIDE HOUSING

BACKGROUND OF THE INVENTION

One of the more severe problems connected with the typical rotary internal combustion engine is the design and preparation of an interengagement between the rotor and side walls of the combustion chamber so that there is little wear under prolonged high temperature and a flood of oil is retained in a localized area to facilitate lubrication of the planetary mounting mechanism for the rotor. A controlled flooding of oil which is typically promoted by the use of annular seals carried by the rotor and are adapted to rub against the side housing to define an oil chamber. Combustion adjacent the oil chamber subjects the side walls to high temperatures such as hot spots at one particular zone of the side housing. Typical prior art coatings for the side housing will lose hardness under such high temperature conditions. Accordingly, when the seals, usually provided with a hard metallic coating, scrape across such side housing surface, wear will be increased in the zone. As wear increases, the integrity and efficiency of the seals to retain the oil within the intended shifting chamber will deteriorate. Escaping oil will cause undue deposits in the engine and promote premature wear of components.

Accordingly, there is a need for a design which will not only prevent wear at such sensitive hot spot zones of the side housing, but at the same time promote a controlled amount of lubrication (both dry and wet) between metallic seals and the side housings. Materials which normally promote high wear-resistance have several drawbacks. If electrolytic, the coating is usually brittle, if a sprayed coating, excessive porosity does not provide for a sufficiently limited and controlled amount of oil film. In either case, prior art materials have not possessed sufficient high temperature hardness stability to meet the challenge of this problem.

SUMMARY OF THE INVENTION

The primary object of this invention is to provide an improved structural combination for rotary internal combustion engine which facilitates a controlled and limited amount of lubrication (both dry and wet) between the side housing and the sliding seals which define a shifting oil chamber between the rotor and side housing; at the same time the combination is designed to promote hardness stability at high operating temperatures particularly where the seals make scraping contact with the side housing.

A feature, pursuant to the above object, is the impregnation of a flame spray or self-fused particle coating with a thermal setting resin, the particle coating being applied to the side housing and consisting substantially of martensitic stainless steel and nickel-based alloy powders. The resin is selected in accordance with three factors: (a) ability to decompose at the operating temperature of the engine, (b) has high resistance to dissolvement in oil, and (c) has a strong adherence to a self-fused coating on the side housing walls. Since side housings are water cooled, a temperature gradient is experienced across the thickness of the wall including the coating. Accordingly, when the resin is subjected to the engine operating temperature, only the resin adjacent the surface of the coating, approximately within 2-4 mils from the surface, will be decomposed resulting in the liberation of gases and leaving of a residue of carbon deposits to act as a dry lubricant.

SUMMARY OF THE DRAWINGS

FIG. 1 is a schematic illustration of an oil cooling circuit for a typical rotary internal combustion engine;

FIG. 2 is a schematic illustration of a rotor, in one position against the typical rotor housing wall, showing the operative areas of the oil film entrained by the rotor seals;

FIG. 3 is an enlarged sectional view of an oil seal shown in one operative position against a portion of a side housing wall;

DETAILED DESCRIPTION

Figure 4:
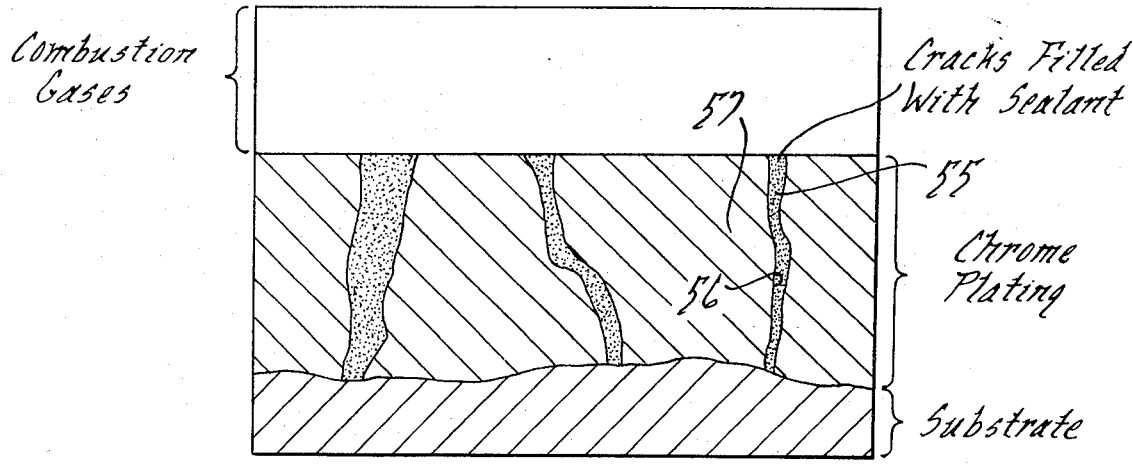
FIG. 4 is an illustration of the microstructure of a portion of the surface treatment for a prior art side housing.

Reference is now made to FIG. 1 for setting forth a brief description of a rotary internal combustion engine and its circulating system. A rotary engine 10 is schematically shown having a pair of rotors 11 and 12 of typical triangular shape. Each of the rotors operate respectively within their own independent epitrochoidally-shaped chamber (13 or 14). Chamber 13 is defined by side housings 15 and 16 and an outer rotor housing 17 having an internally-shaped wall in an epitrochoid configuration. Similarly, chamber 14 is defined by side housing 18 and also by the previous side housing 16 which serves both chambers; rotor housing 19 completes chamber 14. The side housings are closely spaced to define relatively narrow 13 and 14. Each of the side housings have a flat side wall facing inwardly of the chamber and extend across the area enclosed by the innerperiphery of the rotor housings. Rotors 11 and 12 operate as pistons and each are mounted for planetary movement on an eccentric shaft 20, the sides of the rotors 11 and 12 are in very close spacing with respect to the most adjacent side wall of each of the chambers; an annular arrangement of seals 21 define a shifting thin oil chamber on each side of a rotor.

As shown in FIG. 3, each of the seals 21 may be comprised of cast iron and fitted within an annular groove 22 within a side 23 of the rotor. The outer most exposed surface 24 of the seal is angled so that only one edge 27 of the outer surface is designed to engage the side housing. It is typical to apply a chrome coating 25 to one side 26 of the seal; the coating extends outwardly to edge 27 to provide a scraping edge. The angle for defining the outer face 24 of the seal is predetermined and is relatively small.

A circulatory means 30, for supplying oil to the thin shifting oil chambers by continuous flow, is illustrated also in FIG. 1. Oil is drawn from a pan 31 and pumped by way of oil pump 32 to the top of an oil cooler 33; oil leaves the oil cooler at the bottom thereof and is conveyed to an oil filter 34, being subject to a pressure regulator 35 in advance of said oil filter. From the oil filter, the oil is conveyed to the eccentric shaft 20 which has a central channel 36 for conducting oil to the various rotors, utilizing transverse passages 37. The oil is conveyed through appropriate passages in the rotor and is carried outwardly, while the rotor is rotating, into the shifting oil chambers defined between the seals 21 and the sides of the rotor and side housings. Oil is thus effective to lubricate main bearings supporting the rotor shaft as well as other metallic engaging interfaces. The oil then flows into ports 39 in the side housing (communication with the shifting oil chamber) and flows radially outwardly thereof into passages in the rotor housings and eventually is returned to the oil pump for recirculation.

As shown in FIG. 2, when the rotor 11 is in one position, oil floods the entire area entrained within the seal ring 21. As the rotor moves within its planetary motion to another position, one crescent 40 of the oil film that was flooded in the previous area, is scraped as the seal ring shifts to the new location. Accordingly, an additional crescent 41 of oil film is added because of the ring being in a new position. One of the more significant problems in connection with providing an appropriate surface for the side housings is the scraping action of the oil ring as it moves between these various positions resulting from the eccentric movement of the rotor. Not only are these locations exposed to the scraping action of the seal ring, but can be exposed to peak engine operating temperatures. Typically the prior art has been unable to design a material which will retain a high stability under extremely high temperatures such as 450°F at these hottest zones. The compound action of the seal ring can constitute a sliding cutting action for some segments of the seals configuration. This places a severe test upon the high temperature stability of the housing material to withstand wear.

Another problem entails the high flow of oil which is entrained within the seals; such oil flooding is quick to permeate any excessive porosity existing in the sides of the side housing and rotor. Therefore materials of the prior art which have particularly consisted of sprayed coatings usually have a large degree of porosity. When such coatings are drenched with oil, excessive oil excessive and excessive oil decomposition may result leading to poor engine performance. A controlled and limited amount of porosity in the side housing is desirable so that a wet lubricant exists between the scraping action of the seal and also assists in reducing the wearing action. Porosity must be so limited that it prevents oil permeation out of the shifting oil chamber but retains a slight reservoir for oil to supply an oil film existing on the surface of the side housing. To accomplish both of these seemingly opposing goals is the object of the present invention.

The side housings 15, 16 and 18 are made from a material such as cast iron to provide high heat transfer and possess sufficient strength. The surface of a cast iron housing is not sufficiently hard to withstand the riggers of the scraping action or intermetallic engagement experienced in a rotary internal combustion engine. Accordingly, a coating system 45 is employed which is designed to operate compatibly with the various presented surfaces of the seals carried by the rotor. System 45 is particularly comprised of an admixture of two metallic powder types, each of generally equal hardness, the powders being self-fused upon deposition by a flame spray technique. One of the powdered types 46 is comprised of martensitic stainless steel having a chromium content in the range of 12–17 percent (particularly 420 stainless steel having a chromium content by weight of 13 percent). The other powder type 47 is a nickel-based alloy having a hardness generally equal to 420 stainless steel. The powdered types are admixed in dry form, the proportion of mixing being preferably on a 1—1 basis. However, the operative range for achieving the broadest object of this invention permits the proportioning to deviate as much as a 4:1 ratio of nickel-base alloy to martensitic stainless steel, or a 3:1 ratio of martensitic stainless steel and nickel-based alloy. The nickel-based alloy particularly comprises a small addition of iron, preferably about 5 percent, and important additions of fluxing agents in the form of silicon and boron. Silicon being preferably present in the powder in an amount of about 4 percent and boron being present in the powder in an amount of about 3 percent. The fluxing agents assist in creating the proper amount of hardness and adherency of the particles during the flame spraying of the coating. Particles are fed into a flame spray torch, such as an oxi-acetylene gun where the powders are subject to a gas flame for a time sufficient to melt the outer surface of each of the particles to produce a semi-plastic condition. As the result of the gas flow through the gun, the particles are impelled with sufficient force to impact the surface to be coated and cause a flattened or distorted configuration for each of the particles. The particles are not heated sufficiently to achieve a solution condition whereby upon deposition they will be cooled to effect a hardness change in the particles. The starting hardness of the particles is maintained constant throughout the flame spray technique. Upon congealing of the surface of each of the particles, a self-fusing effect takes place to provide a rigid and adherent coating. To stimulate the proper amount of melting at the surface of each of the particles, the silicon and boron come out of solution in the particle type (being lower in melting temperature than the other constituents) which effectively stimulates the surface fluid for self-fusing. Silicon and boron come out to form low melting eutectics. The nickel-based alloy may also have a chromium constituent as well as a small amount of carbon, for example 1.0 carbon and 13.25 chromium. As deposited, the resulting composition or coating consists generally of 0.5 percent carbon, 13.25 percent chromium, 37 percent nickel, 1.5 percent boron, 2.5 percent silicon and 45 percent iron. Coating, in general, consists of a hard martensitic stainless steel matrix and equally hard borides, oxides, carbides and silicides. The oxygen, most importantly, being maintained in the interstitial state within the composition.

One of the important phenomenon observed with the use of the above composite coating is its ability to maintain a stable hardness value at high temperatures. For example, temperatures at 400°F (typical for the substrate temperature of the side walls of the rotary engine) a minimum hardness has been consistently obtained at $R_c$ 30. Such hardness level has been observed at even higher temperatures up to 1,100°F indicating the temperature stability of the coating. This ability to maintain a stable hardness at elevated temperatures is unique and results from a combination of regulated particle chemistry and deposition method.

With prior art materials that have been deemed very hard at ambient temperatures, deterioration and loss of sealing efficiency has been observed at the higher temperature levels. The action of the side seals and oil seals is rigorous; selected points of the side seals and oil seals undergo a compound rotary sliding movement against the side housing and other points on the seals undergo a substantially reciprocating movement similar to the back and forth movement of a knife. Such reciprocating seal movement, when working against the hottest portion of the side housing, will cause a significant local wear in the prior art materials leading to gas leakage. But the coating of this invention exhibits little or no wear under such adverse conditions.

In any powder sprayed coating, porosity is an inherent in the range of 6 to 15 percent depending upon impact and heating characteristics of the spray gun. Such porosity appears as voids 48 between each of the self-fused particles and actually operate as interconnected channels throughout the entire coating. Such interconnected channels provide a convenient path for the oil distributed to the oil chamber to permeate and flow away from the intended oil areas.

The approach of the present invention is to fill the pores 48 of the deposited coating with a slurry mixture 50 comprised of phenolic resin (thermal setting type) which is carefully selected to decompose precisely at the engine operating temperature, the temperature being defined to be that of the peak temperature achieved by the side walls adjacent the point of combustion. Typically this is about 400° to 450° for an engine designed as in FIG. 1. However, the engine may be designed to have an operating temperature anywhere up to 650°F and the resin must be selected with that condition in mind. Additional characteristics must be adhered to in the selection of the resin to obtain the results of this invention. Not only must the resin precisely decompose at the engine operating temperature, but the resin must have a strong adherence to the substrate (here being the self-fused stainless steel and nickel-based alloyed powders), and also have a high resistance to dissolvement by oil. These criteria limit the selection of the resin to the groups consisting of phenolics, polyimides, polyarylsulfones, polydimethyl siloxane, and polymethyl phenyl siloxane and silicones, each further selected with a decomposition temperature of the maximum operating temperature of the engine. All of these are long chained thermal setting polymer types. The resin is applied in a slurry to the coating so as to penetrate and be absorbed into the pores of the coating at least to a depth of 5–10 mils, the coating being deposited in a thickness in approximately 8–15 mils.

Since the side housings have internal fluid chambers within which cooling oil is circulated as part of the oil circulating system, a thermal gradient is set up between the inner surface of the sprayed coating on the side housing and the interior core of the housing such that only closely adjacent to the outer surface of the coating is the engine operating temperature experienced. Such temperature can be measured to penetrate approximately 2 to 4 mils. Therefore, upon engine operation, the slurry impregnated into the porous coating is decomposed to the extent of the 2 to 4 mils leaving the original voids in the porous coating while retaining the resin in a crystallized solid form beneath the subsurface of the coating. The resin is decomposed into gas which is liberated and into a carbon deposit. Carbon deposits are important to this invention in that they operate as a dry lubricant to assist the controlled oil film operating as a wet lubricant.

One application by the prior art of a phenolic resin to a rotary internal combustion engine is shown in U.S. Pat. No. 3,289,649. In this patent, a phenolic resin 55 was applied to totally fill the pores of a sprayed coating system applied to a rotor housing for the rotary engine. The rotor housing, of course, experiences a different environmental condition from the oil circulating standpoint as well as from the heat environment standpoint. The intended object of the patented invention was to make sure that there was no porosity throughout any portion of the surface of the rotor housing. Furthermore, the porous composition for retaining the resin was carbon steel, different in physical characteristics from the presently self-fused coating. The only way to make such a sprayed plain carbon steel operate with enhanced wear characteristics is to apply chrome plating, typical for a commercial rotor housing of this type. When a resin is then impregnated into voids 56 of chrome plating 57, the microstructure appears as that shown in FIG. 4. Chromium plating experiences heat checking providing very narrow cracks (voids 56) at deep penetrating locations. The resin, which is applied to the surface of the chrome plating, fills the cracks and presents an undesirable discontinuous coating system. Furthermore, the patent has not appreciated the selective choice of the resins which will precisely decompose at the engine operating conditions as set forth to give the burn back of limited porosity.

Figure 5:
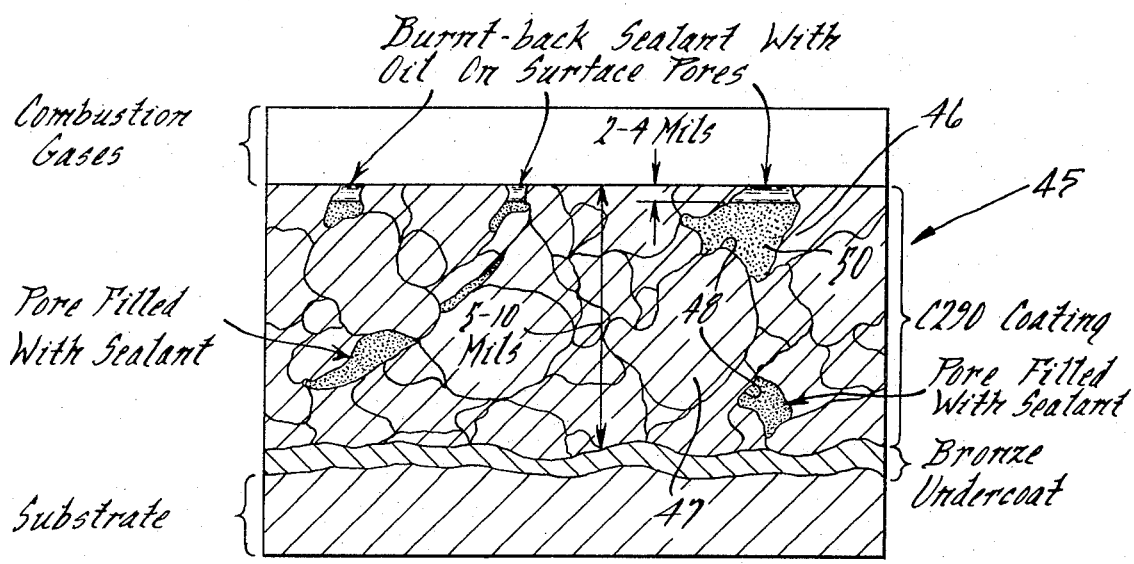
FIG. 5 illustrates the microstructure of a side housing surface coating system utilizing the invention herein.

To more visually present the structure of the inventive coating system herein, FIG. 5 shows the general arrangement of the particles 46 and 47 comprising the sprayed coating. Intermixed among the particles are the voids 48 of rather random shape. The pores are filled to a depth of approximately 5–10 mils with the resin 50 and as shown, the resin in that portion of the pores to a depth of about 2–4 mils is decomposed resulting in an open pore which will be filled with oil.

For further details as to a preferred method of preparing the sprayed construction of this invention, see copending U.S. Ser. No. 376,861, now U.S. Pat. No. 3,833,321, columnly assigned to the Assignee of this invention and entitled "Wear-Resisting Coating for Rotary Engine Side Housing and Method of Making." Said cross-reference application is incorporated herein by reference.

We claim as our invention:

1. In a rotary internal combustion engine having a narrow chamber bounded by a pair of flat side walls and an end wall joining said side walls, a rotor mounted for planetary movement in said chamber and in close spacing with each of said side walls, said rotor carrying annular seals to slidingly engage said side walls for defining a shifting oil chamber in the spacing between said rotor and each of said side walls, the combination comprising:
   a. means for supplying said oil chambers with a continuous flow of oil,
   b. a self-fused particle coating across the entire area of each of said flat side walls, said coating being comprised of an admixture of stainless steel and nickel-based alloy powders of generally equal hardness, and
   c. a resin in said coating effective to close the pores therein below the surface of said coating without closing the pores adjacent the coating surface to thereby provide a controlled porosity of 2–3 percent of the volume of said coating, said resing being selected from those materials which decompose at the engine operating temperature, have a strong adherency to the metallic self-fused particle coating, and have a high resistance to dissolvement in oil.

2. The combination as in claim 1, in which said resin is a thermosetting epoxy phenolic which decomposes at a temperature of about 400°F.

3. The combination as in claim 1, in which a carbon deposit resides in the open pores adjacent the surface of said coating serving to additionally provide dry lubrication for the sliding seals against said coating.

4. The combination as in claim 1, in which a thermal gradient exists within the coating and side housing wall so that resin closing the pores adjacent said surface decomposes an under engine operation to liberate gases and leave a dry lubricant deposit in the form of carbon.

5. The combination as in claim 1, in which the coating has a thickness of 15–25 mils and the non-closed pores extend from said coating surface to an extent of 2–4 mils.

6. The combination as in claim 1, in which the seals are comprised of a metallic substrate coated with chromium, one edge of said chromium being in contact with said self-fused particle coating on said housing to scrape thereacross during shifting of said oil chamber, said 2–3 percent porosity facilitating a supply of oil to maintain an oil film on said coating to lubricate said scraping.

* * * * *